(12) United States Patent
Behrends et al.

(10) Patent No.: US 6,820,914 B2
(45) Date of Patent: Nov. 23, 2004

(54) PASSENGER VEHICLE HAVING A REMOVABLE REAR SEAT CUSHIONS, AND STOWAGE SPACE FOR THE SAME

(75) Inventors: Hagen Behrends, Sindelfingen (DE); Dieter Henke, Boeblingen (DE); Bernd Loeper, Schwaikheim (DE)

(73) Assignee: DaimerChrysler AG, Stuttgart (DE)

( * ) Notice: Subject to any disclaimer, the term of this patent is extended or adjusted under 35 U.S.C. 154(b) by 0 days.

(21) Appl. No.: 10/291,803

(22) Filed: Nov. 12, 2002

(65) Prior Publication Data

US 2003/0107233 A1 Jun. 12, 2003

(30) Foreign Application Priority Data

Nov. 9, 2001 (DE) .......................... 101 55 218

(51) Int. Cl.⁷ ................................ B60N 2/02
(52) U.S. Cl. ................ 296/66; 296/37.14; 297/15; 297/312; 297/337; 297/383
(58) Field of Search ................ 296/65.01, 65.05, 296/65.09, 66, 37.2, 37.3, 37.8, 37.14, 37.16; 297/15, 311, 312, 337, 353, 383

(56) References Cited

U.S. PATENT DOCUMENTS

| | | | |
|---|---|---|---|
| 4,979,772 A | * | 12/1990 | Carey |
| 5,269,581 A | | 12/1993 | Odgaki et al. |
| 5,662,367 A | | 9/1997 | Rastetter et al. |
| 5,868,451 A | * | 2/1999 | Uno |
| 6,089,641 A | * | 7/2000 | Mattarella |
| 6,193,317 B1 | * | 2/2001 | Mitschelen |
| 6,279,982 B1 | * | 8/2001 | Nishimura |
| 6,416,107 B1 | * | 7/2002 | Kanaguchi et al. |

FOREIGN PATENT DOCUMENTS

| | | | | |
|---|---|---|---|---|
| DE | 1435537 U | | 4/1938 | |
| DE | 44 31 248 C1 | | 8/1995 | |
| DE | 42 23 258 C2 | | 8/1997 | |
| DE | 19838882 A1 | * | 3/2000 | ............... 296/65.01 |

OTHER PUBLICATIONS

Volvo Cars of North America Inc., Volvo S70/V70, 1998, edition 2000, pp., 58, 60, 61 and 65.*

* cited by examiner

Primary Examiner—Lori L. Coletta
(74) Attorney, Agent, or Firm—Crowell & Moring LLP

(57) ABSTRACT

A passenger vehicle is equipped with a rear seat bench which has a backrest and a seat cushion. The backrest and seat cushion are divided, in each case, into a ⅓ part and a ⅔ part. The backrest parts can be deposited in a storage space of the respective, assigned seat cushion part. The ⅔ seat cushion part is of removable design. Arranged behind the rear seat bench is a loading space having a height-adjustable loading floor which can be adjusted between a lower position in which the loading floor is situated approximately level with a vehicle floor, and an upper position in which an auxiliary storage space is formed between the loading floor and the vehicle floor. This auxiliary loading space is dimensioned in such a manner that the removed ⅔ seat cushion part can be accommodated therein.

9 Claims, 3 Drawing Sheets

PASSENGER VEHICLE HAVING A REMOVABLE REAR SEAT CUSHIONS, AND STOWAGE SPACE FOR THE SAME

BACKGROUND AND SUMMARY OF THE INVENTION

This application claims the priority of German Patent Document 101 55 218.1, filed on Nov. 9, 2001, the disclosure of which is expressly incorporated by reference herein.

The present invention relates to a passenger vehicle having a rear seat bench which has a backrest and a seat cushion, the backrest and seat cushion being divided in each case into a ⅓ part and a ⅔ part.

In the case of a rear seat bench which can be divided in this manner, the seat cushion parts can be folded upwards and forwards independently of each other and independently of the backrest parts, the upwardly folded seat cushion parts then in each case opening up a storage space. After the seat cushion parts are folded upwards, the backrest parts can be folded downwards and forwards independently of each other, in which case they can be deposited in the storage space of the respectively assigned and previously upwardly folded seat cushion part. A loading space arranged behind the rear seat bench can be extended forwards by the rear seat bench folded over in this manner. However, the loading space, which can be enlarged in this manner, of the vehicle is bounded forwards by the upwardly folded seat cushion parts, so that, particularly in the case of small vehicles, the accommodation of relatively long objects in the loading space is made more difficult.

In German Patent Document DE 42 37 258 C2, corresponding to U.S. Pat. No. 5,269,581, a passenger vehicle which has a loading space with a loading space floor behind the rear seats is disclosed. An additional rear seat bench having a backrest and a seat cushion is arranged behind the rear seats on this loading space floor. The backrest can be folded downwards and forwards onto the seat bench. Behind this additional rear seat bench the loading space floor contains a depression. When the backrest is folded downwards, the seat cushion of the additional rear seat bench can be folded away rearwards and stowed in the depression. A lower side of the seat cushion then forms a flat and flush-adjoining part of the loading space floor.

It is known from German Patent Document DE 14 35 537 U to pivot the rear seat bench in a passenger vehicle forwards into the foot well of the rear region, the backrest also being folded downwards and forwards onto the seat cushion. In the position of use of the rear seat bench, the lower side of the seat cushion rests on a support surface. With the rear seat bench pivoted into the rear foot well, the lower side of the seat cushion together with the supporting surface forms a level surface.

German Patent Document DE 44 31 248 C1 and corresponding U.S. Pat. No. 5,662,367 show a back seat bench which can be removed from a passenger vehicle. For this purpose, the rear seat bench is fastened to the floor of the interior via releasable anchoring points. The seat bench which is removed from the vehicle has then to be stored at a suitable location outside the vehicle, for example in a garage, which is frequently found to be awkward and costly.

The present invention is concerned with the problem of specifying, for a passenger vehicle of the type mentioned at the beginning, an embodiment which simplifies the transportation of relatively long objects in the vehicle.

This problem is solved according to certain preferred embodiments of the invention by a passenger vehicle having a rear seat bench with a backrest and a seat cushion; the backrest being divided into a ⅓ backrest part and a ⅔ backrest part; the seat cushion being divided into a ⅓ seat cushion part and a ⅔ seat cushion part; the seat cushion parts being foldable upwards and forwards independently of each other and independently of the backrest parts, the seat cushion parts, in each case, opening up a storage space; the backrest parts being foldable downwards and forwards independently of each other and being depositable in the storage space of the respectively assigned seat cushion part; the ⅔ seat cushion part being removable; a loading space being arranged behind the rear seat bench having a height-adjustable loading floor; the loading floor being adjustable between a lowered, lower position in which the loading floor is situated approximately level with a vehicle floor, and a raised, upper position in which an auxiliary storage space is formed between the loading floor and the vehicle floor; and the auxiliary storage space being dimensioned in such a manner that the removed ⅔ seat cushion part can be accommodated therein. Advantageous embodiments are described below and in the claims.

Certain preferred embodiments of the invention are based on the general concept of designing at least the ⅔ seat cushion part to be releasable or removable and, in order to accommodate the removed ⅔ seat cushion part in the loading space, of providing an auxiliary storage space envisaged for this purpose. In this manner, the removed seat cushion part can be accommodated in the vehicle in a space-saving manner and taken along. The removal of the ⅔ seat cushion additionally enables the loading space to be extended forwards, as a result of which the accommodating of large, bulky objects in the loading space is facilitated.

Of particular importance in this connection is the height-adjustable loading floor which, in its lowered, lower position, ensures a maximum loading volume with an auxiliary storage space not being required. With the loading floor adjusted into its raised, upper position, the auxiliary storage space required for accommodating the ⅔ seat cushion part is separated from the entire loading volume. This construction ensures that the storage space required for accommodating the ⅔ seat cushion part is available with just a few maneuvers, it being possible for the remaining loading space to be loaded without being impaired by the ⅔ seat cushion part. It is clear that the loading floor can be used entirely for loading purposes both in its lower position and in its upper position.

An embodiment, in which the downwardly folded backrest part at its rear side adjoins, in a basically infinitely variable manner, the loading floor, which is adjusted into its upper position, and extends the latter in a basically essentially flat manner forwards into the rear region, is of particular advantage. In the case of this construction, the loading floor important for the loading of the loading space is enlarged, as a result of which the usability of the loading space is enlarged overall.

The loading floor in its upper position can expediently adjoin, in a basically infinitely variable manner, a loading edge of a rear tailboard of the vehicle, which tailboard bounds the loading space to the rear. In the case of this embodiment, the loading and unloading of the loading space and of the loading floor is considerably simplified if the loading floor is adjusted into its upper position.

In another development, the loading floor can have a cover or can be designed as a cover with which the auxiliary storage space can be closed, the auxiliary storage space then being dimensioned in such a manner that, even with the ⅔ seat cushion part accommodated therein, it can be correctly closed by the cover when the loading floor is in its upper position. This construction ensures that the ⅔ seat cushion part, which has been removed and accommodated in the auxiliary storage space, does not impair the loadability of the loading floor.

In a particularly advantageous embodiment, the ⅓ seat cushion part can also be removed, the vehicle floor then containing, below the height-adjustable loading floor, a depression which is dimensioned such that the removed ⅓ seat cushion part can be accommodated therein in such a manner that the ⅔ seat cushion part can be correctly accommodated in the auxiliary storage space, in particular with a correctly closeable cover. In this embodiment, the loading space can therefore also be enlarged in the region of the ⅓ seat cushion part.

In one development, the depression provided in the vehicle floor for accommodating the ⅓ seat cushion part can also be dimensioned such that, instead of the ⅓ seat cushion part, a spare wheel of the passenger vehicle can be accommodated therein without obstructing the stowability of the ⅔ seat cushion part in the auxiliary storage space as a result. By this, the depression obtains a dual function, so that either the spare wheel or the ⅓ seat cushion part can be stowed therein.

In another development, the depression can be dimensioned such that the loading floor can be correctly lowered into its lower position even if the removed ⅓ seat cushion part or the spare wheel is accommodated in the depression. This construction ensures that, with the loading floor lowered, the storage space can be used to the maximum.

The passenger vehicle can expediently have a front passenger's seat with backrest and seat cushion, the seat cushion being foldable upwards and forwards and in the process opening up a storage space in which the backrest, which can be folded downwards and forwards, can be deposited, the downwardly folded backrest at its rear side adjoining, in a basically infinitely variable manner, the downwardly folded backrest part and extending the loading space floor in a basically flat manner forwards into the front-passenger's region. This measure also makes possible an additional increase in the loading space, in particular an extension of the loading space floor, as a result of which the space utilization in the vehicle interior is additionally improved.

In order to increase the comfort, it may be expedient to design the backrest of the front passenger's seat in a manner such that it can be tilted over forwards and can be placed onto the seat cushion, which is in its position of use, the rear side of the tilted-over backrest then extending basically parallel to the loading space floor at a level which is raised with respect thereto. In this folded position, the rear side of the backrest of the front passenger's seat can be used as a table.

It goes without saying that the features mentioned above and those which have yet to be explained below can be used not only in the respectively stated combination, but also in other combinations or on their own without departing from the scope of the present invention.

DETAILED DESCRIPTION OF THE DRAWINGS

Figure 1:
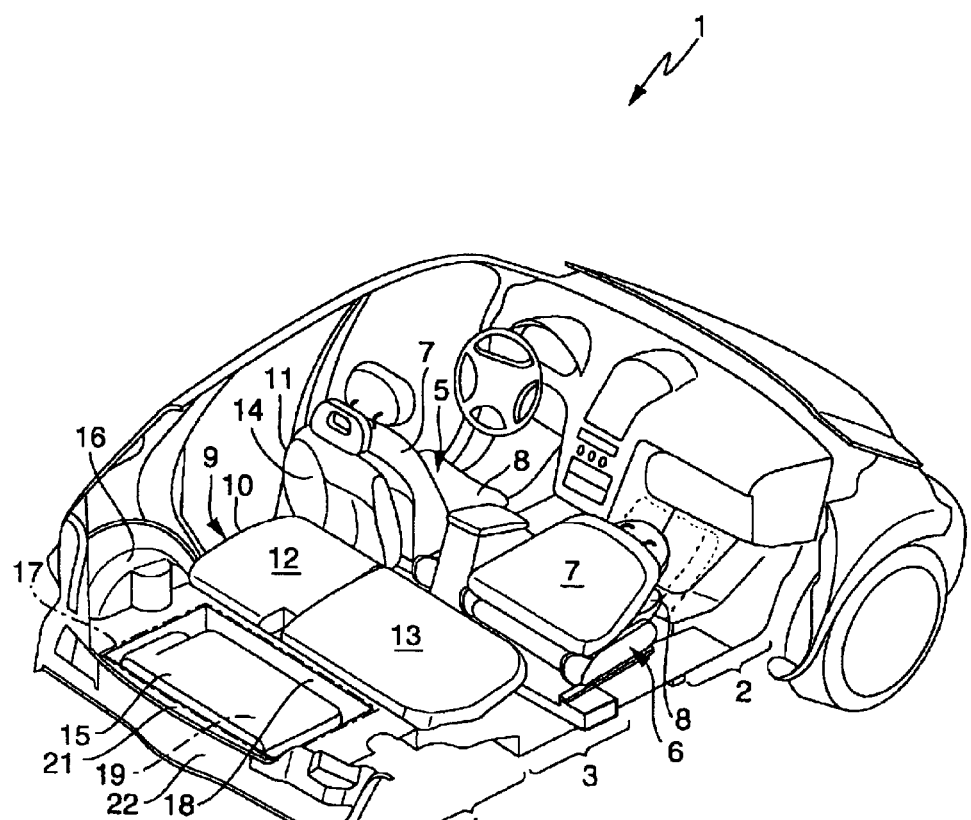
FIG. 1 shows a perspective view of a partially cut-away passenger vehicle.

As shown in FIG. 1, a passenger vehicle 1, which is preferably designed as a small vehicle, has, in its interior from the front to the rear, a front space region 2, which is indicated by a curved bracket, a rear space region 3, which is indicated by a curved bracket, and a loading space region 4, which is indicated by a curved bracket. A driver's seat 5 and a front passenger's seat 6, which in each case have a backrest 7 and a seat cushion 8, are arranged in the front space region 2. A dividable rear seat bench 9, which likewise has a backrest 10 and a seat cushion 11, is arranged in the rear space region 3. The backrest 10 is divided into a ⅓ backrest part 12 and a ⅔ backrest part 13. In the same manner, the seat cushion 11 is also divided into a ⅓ seat cushion 14 and a ⅔ seat cushion 15.

The seat cushion parts 14 and 15 can be folded upwards and forwards independently of each other and independently of the backrest parts 12 and 13. In FIG. 1, the ⅓ seat cushion part 14 is adjusted into its position in which it is folded upwards and forwards. The ⅔ seat cushion part 15 is also arranged in a manner such that it can be removed, i.e., is secured in a manner such that it can be released in the region of its pivot axis. In FIG. 1, the ⅔ seat cushion part 15 has already been removed. Furthermore, the backrest parts 12 and 13 can be folded downwards and forwards independently of each other, they being pivoted, in each case, into a storage space which is formed when the seat cushion parts 14 and 15 are folded upwards.

In the loading space region 4, a loading space 16 is formed behind the rear seat bench 9. This loading space 16 contains a loading floor 17 which is mounted in a manner such that it can be adjusted in height relative to a vehicle floor 22. An appropriate mounting and guide, in particular a slotted guide, can be designed in a conventional manner and therefore does not need to be explained in greater detail.

Figure 2:
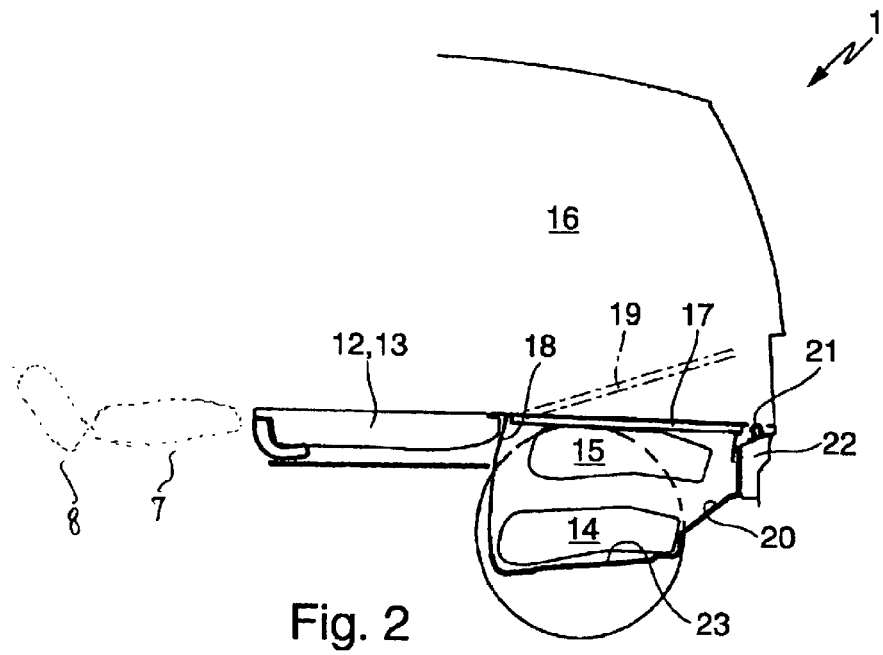
FIG. 2 shows a greatly simplified sectional view in the rear region of the passenger vehicle according to FIG. 1 with the loading floor raised.
Figure 3:
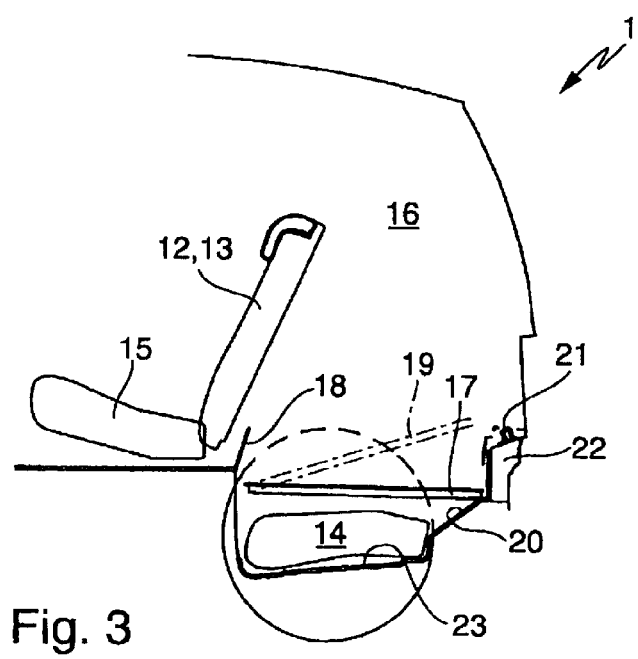
FIG. 3 shows a view as in FIG. 2, but with the loading floor lowered.

With reference to FIGS. 2 and 3, the loading floor 17 can be adjusted between a raised, upper position, which is shown in FIG. 2, and a lowered, lower position, which is shown in FIG. 3. While the loading floor 17 rests in its lower position on the vehicle floor 20 and is therefore approximately level with the vehicle floor 20, in the upper position of the loading floor 17 an auxiliary storage space 18 is formed between the vehicle floor 20 and the loading floor 17. This auxiliary storage space 18 is dimensioned such that the removed ⅔ seat cushion part 15 can be accommodated therein.

In the illustrations of FIGS. 1 and 2, the ⅔ seat cushion part 15 is already stowed in the auxiliary storage space 18. The auxiliary storage space 18 can usually be closed by a cover 19. This cover 19 may be formed by the loading floor 17 itself. Equally, the loading floor 17 may have the cover 19 which, when closed, forms an extensive part of the loading floor 17. The dimensioning of the auxiliary storage space 18 is coordinated with the dimensions of the ⅔ seat cushion part 15 in such a manner that, even with the ⅔ seat cushion part 15 accommodated therein, the auxiliary storage space 18 can be correctly closed by the cover 19. This means, for example, that the cover 19 can then also be used as a loadable part of the loading floor 17.

According to FIG. 2, the loading space 16 is bounded to the rear, with respect to the direction of travel, by a rear tailboard 22. This rear tailboard 22 has a loading edge 21 at the top. The loading floor 17 is advantageously designed in such a manner that in its upper position it adjoins the loading edge 21 in a basically infinitely variable manner, i.e., flush. This construction considerably simplifies the loading and unloading of the raised loading floor 17.

According to FIGS. 1 and 2, the rear sides of the backrest parts 12 and 13 expediently form an extension of the raised loading floor 17 into the rear space region 3 when the backrest parts 12 and 13 are folded downwards and forwards and are deposited into the storage space opened up by the seat cushion parts 14 and 15. The rear sides of the backrest parts 12 and 13 adjoin the loading floor 17 in a basically infinitely variable manner and form together with the latter a level surface which is particularly easy to load.

The backrest 7 of the front-passenger's seat 6 may expediently also be designed in a manner such that it can be tilted over forwards, it then being possible for the backrest 7 to be placed onto the seat cushion 8 which is still in its position of use. In the case of this folding situation, the rear side of the tilted over backrest 7 extends basically parallel to the loading floor 17, this rear side being situated, however, at a raised level with respect to the loading floor 17. By means of this folding situation, the loadability of the vehicle 1 can additionally be increased. Moreover, the front passenger's seat 6 folded over in such a manner may also be used as a table.

The front passenger's seat 6 may expediently also be designed in such a manner that its seat cushion 8 can be folded upwards and forwards and in the process opens up a storage space in which the backrest 7, which can be folded downwards and forwards, can be deposited. In the case of this folding situation, the rear side of the backrest 7 is positioned at a lower level which corresponds approximately to the level of the loading space floor 17. This kinematics of the front passenger's seat 6 makes possible a further enlargement of the loading space which is available, it being of particular advantage here that the downwardly folded backrest 7 at its rear side adjoins the downwardly folded ⅔ backrest part 13 in a basically infinitely variable manner. Moreover, the rear side of the downwardly folded backrest 7 of the front passenger's seat 6 extends the loading space floor 17 beyond the rear space region 3 into the front space region 2 and into the front-passenger's region, the rear side of the backrest 7 also being extended basically flat and parallel to the loading space floor 17 here.

Figure 4:
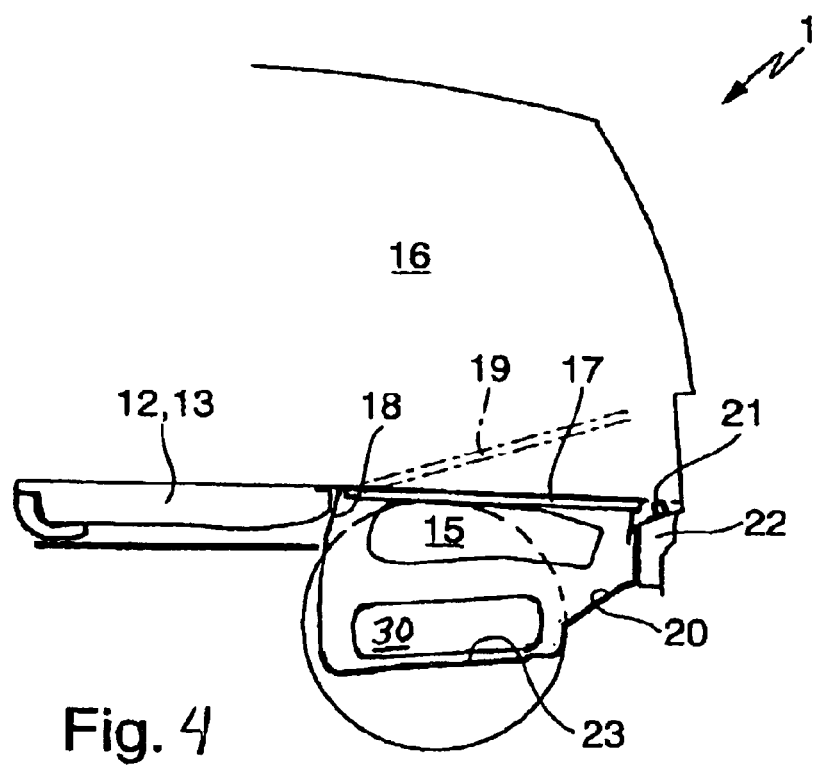
FIG. 4 shows as a further embodiment of the invention, in which a spare wheel is stored in the storage area.

According to FIGS. 2 and 3, an embodiment, in which the vehicle floor 22 contains a depression 23 below the auxiliary storage space 18 provided for accommodating the ⅔ seat cushion part 15, is particularly advantageous. This depression 23 can firstly be dimensioned such that a spare wheel 30 of the passenger vehicle 1 can be accommodated therein, as shown in FIG. 4, without the correct accommodating of the ⅔ seat cushion part 15 in the auxiliary storage space 18 being obstructed as a result. As an alternative or in addition, this depression 23 may also be dimensioned such that the ⅓ seat cushion part 14 can be accommodated therein in such a manner that as before the ⅔ seat cushion part 15 can be correctly stowed in the auxiliary storage space 18. For this purpose, the ⅓ seat cushion part 14 is then also designed in a manner such that it can be removed, i.e., is fastened releasably to the vehicle.

According to FIG. 3, the depression 23 is expediently dimensioned in such a manner that the spare wheel or the ⅓ seat cushion part 14 can be accommodated therein even if the loading floor 17 is lowered into its lower position.

The particular advantage of the passenger vehicle 1 according to certain preferred embodiments of the invention is found in that the ⅔ seat cushion part 15, which can be removed in order to enlarge the loading space 16 and the loading floor 17, and, if appropriate, also the ⅓ seat cushion part 14 can be accommodated in the vehicle 1 in a storage space specially provided for it, namely in the auxiliary storage space 18 or in the above-mentioned depression 23 in the vehicle floor 20. This construction makes it possible for the respective, removed seat cushion part 14 and/or 15 to be carried along in the vehicle 1 without the loadability of the loading space 16 or the loading space 17 being impaired as a result.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Passenger vehicle having a rear seat bench:
   the rear seat bench having a backrest and a seat cushion,
   the backrest being divided into a ⅓ backrest part and a ⅔ backrest part,
   the seat cushion being divided into a ⅓ seat cushion cart and a ⅔ seat cushion part,
   the seat cushion parts being foldable upwards and forwards independently of each other and independently of the backrest parts, the seat cushion parts, in each case, opening up a storage space,
   the backrest parts being foldable downwards and forwards independently of each other and being depositable in the storage space of the respectively assigned seat cushion part, such that a rear side of the backrest parts forms a substantially horizontal surface,
   the ⅔ seat cushion part being removable,
   a loading space being arranged behind the rear seat bench having a height-adjustable loading floor,
   the loading floor being adjustable between a lower position in which the loading floor is situated approximately level with a vehicle floor and an upper position in which an auxiliary storage space is formed between the loading floor and the vehicle floor, and
   the auxiliary storage space being dimensioned in such a manner that the removed ⅔ seat cushion cart can be accommodated therein,
   wherein, in use, a rear side of the downwardly folded backrest part adjoins the upper position of the loading floor and extends the loading floor in a basically flat manner forwards into a rear space region assigned to the rear seat bench.

2. Passenger vehicle according to claim 1, wherein the loading floor in the upper position adjoins a loading edge of a rear tailboard which bounds the loading space.

3. Passenger vehicle according to claim 1, wherein the loading floor comprises a cover with which the auxiliary storage space can be closed, the auxiliary storage space being dimensioned in such a manner that, even with the ⅔ seat cushion part accommodated therein, the auxiliary storage space can be correctly closed by the cover when the loading floor is in the upper position.

4. Passenger vehicle according to claim 1, wherein the ⅓ seat cushion part is removable, and wherein the vehicle floor contains, below the loading floor and below the auxiliary storage space, a depression which is dimensioned such that, in use, the removed ⅓ seat cushion part can be accommodated therein in such a manner that the ⅔ seat cushion part can additionally be correctly accommodated in the auxiliary storage space.

5. Passenger vehicle according to claim 4, wherein the depression is dimensioned such that, instead of the ⅓ seat cushion part, a spare wheel of the passenger vehicle can be accommodated therein in such a manner that the ⅔ seat cushion part can additionally be correctly accommodated in the auxiliary storage space, in use.

6. Passenger vehicle according to claim 1, wherein the passenger vehicle has a front passenger seat with a backrest and seat cushion, the passenger seat cushion being foldable upwards and forwards to thereby open a front storage space in which the passenger seat backrest, which is foldable downwards and forwards, can be deposited, in use, the downwardly folded backrest at a rear side adjoining the adjacent, downwardly folded backrest part of the rear seat bench and extending the loading floor in a basically flat manner forwards into a front-passenger region assigned to the front passenger seat.

7. A vehicle assembly, comprising:
- a rear seat bench with a backrest and a seat cushion, the backrest being divided into a ⅓ part and a ⅔ part and the seat cushion being divided into a ⅓ seat part and a ⅔ seat part, the seat parts being foldable upwards and forward independently of each other and independently of the backrest parts;
- a storage space which is openable by the seat parts, the backrest parts being foldable downward and forward independently of each other and depositable in the storage space, and the ⅔ seat part being removable;
- a loading space arranged behind the rear seat bench; and
- a loading floor associated with the loading space, the loading floor being adjustable between a lowered position approximately level with a vehicle floor, and a raised position in which an auxiliary storage space is formed between the loading floor and the vehicle floor, and in which a rear side of the downward and forward folded backrest parts is substantially flush with the raised loading floor and extends said loading floor in a substantially flat manner, forward into a space assigned to the rear seat bench;
- wherein the auxiliary storage space is dimensioned so that the ⅔ seat part is accommodatable.

8. A passenger vehicle comprising:
- at least one front seat;
- a rear seat situated rearward of said at least one front seat, and having a cushion part and a backrest part;
- at least a portion of said rear seat cushion part being foldable upward and forward, opening a storage space, and at least a portion of said rear seat backrest part being foldable downward and forward into the storage space, such that a rear side of said backrest part forms a substantially horizontal surface;
- a loading space disposed rearward of the rear seat; and
- a loading floor disposed in said loading space, said loading floor being adjustable between a lower position in which the loading floor is situated approximately level with a vehicle floor of said vehicle, and an upper position in which an auxiliary storage space is formed between the loading floor and said vehicle floor;
- wherein said upper position of said loading floor is substantially flush with said substantially horizontal surface formed by the rear side of the rear seat backrest part when it is folded forward and downward, said substantially horizontal surface extending the loading floor in substantially flat manner, forward into a space assigned to said rear seat.

9. The passenger vehicle according to claim 7, wherein the auxiliary storage space is dimensioned such that a removable portion of said rear seat cushion can be accommodated therein.

* * * * *